United States Patent [19]

Clark

[11] 4,192,525
[45] Mar. 11, 1980

[54] STEERING SULKY FOR TWO-WHEEL TRACTORS

[75] Inventor: John D. Clark, Winston-Salem, N.C.

[73] Assignee: Clarke-Gravely Corporation, Clemmons, N.C.

[21] Appl. No.: 944,708

[22] Filed: Sep. 22, 1978

[51] Int. Cl.² ............................................. B62D 53/02
[52] U.S. Cl. ................................... 280/443; 180/11; 280/32.7; 280/63
[58] Field of Search ...................... 280/32.7, 442, 443, 280/444, 426, 63; 180/11, 12, 135

[56] References Cited

U.S. PATENT DOCUMENTS

| 2,100,447 | 11/1937 | Mahaffey | 280/443 |
|---|---|---|---|
| 2,450,215 | 9/1948 | Wilson | 280/443 |
| 2,470,842 | 5/1949 | Barrington | 280/444 |
| 2,660,447 | 11/1953 | Bear | 180/11 |
| 2,740,462 | 4/1956 | Stegeman | 280/32.7 |
| 2,855,060 | 10/1958 | Colburn | 180/11 |
| 3,336,042 | 8/1967 | Southall | 280/32.7 |
| 3,753,580 | 8/1973 | Folkert | 280/443 |

OTHER PUBLICATIONS

Gravely Tractor Co. Catalog page.

*Primary Examiner*—Robert R. Song
*Assistant Examiner*—Donn McGiehan
*Attorney, Agent, or Firm*—Bell, Seltzer, Park & Gibson

[57] ABSTRACT

A two-wheel tractor is provided with an improved type of steerable two-wheel trailer having a steering mechanism which enables an operator of the tractor seated in the trailer to bring about turning movement of the tractor-trailer assembly in a natural and efficient manner by applying a lateral steering force to the handlebars of the tractor. This arrangement minimizes the steering force required upon the tractor handlebars and the amount of lateral movement thereof relative to the trailer while also providing enhanced lateral stability to the tractor and trailer assembly.

8 Claims, 5 Drawing Figures

STEERING SULKY FOR TWO-WHEEL TRACTORS

FIELD OF THE INVENTION

This invention relates to tractors, and more particularly to a two-wheel tractor provided with an improved type of steerable trailer.

BACKGROUND OF THE INVENTION

One well known type of lawn and garden tractor is characterized by having an engine and transmission supported by a single pair of driven wheels. A pair of rearwardly extending handlebars is provided for guiding and balancing the tractor, and a power shaft is provided at the front of the tractor for driving various attachments such as mowers, plows, cultivators, etc. This type of tractor is generally referred to as a "two-wheel tractor".

This tractor may be operated as a walking tractor with the operator walking behind the tractor and grasping the handlebars to guide and balance the tractor. Alternatively, the tractor may be connected to a trailer attachment such as a sulky, cart, spreader, lawn roller, etc. and operated as a riding tractor.

A two-wheel trailer in the form of a sulky is most often used to convert the two-wheel walking tractor into a riding tractor to allow the operator to be seated while driving the tractor. Two types of sulky attachments have been conventionally used with two-wheel tractors. The first type consists merely of a frame with a seat supported on a pair of non-pivotal wheels. The operator guides the tractor and sulky assembly by pushing or shifting the handlebars laterally to thereby alter the course of the tractor. Because of the relatively large displacement of the tractor handlebars relative to the operator with this type of sulky arrangement, steering is somewhat difficult, and in order to execute a relatively sharp turn, the tractor controls may move beyond the reach of the operator.

In the other known type of sulky, the wheels are pivotally mounted and a steering wheel is mounted on the sulky for controlling the turning movement of the wheels. The operator guides the tractor and sulky assembly by turning the steering wheel in the desired direction, thus pivoting the wheels and bringing about articulative movement between the tractor and sulky, and thereby guiding the tractor in the desired direction. While this type of steerable sulky makes steering somewhat easier than with the aforementioned non-steerable type of sulky, the movement of this tractor-sulky combination as a result of the rear wheel steering is unconventional to the average individual, who is accustomed to the normal front-wheel steering of most vehicles. Also, the use of the steering wheel in addition to the other hand controls of the tractor makes the operator have need for a third hand in some situations.

SUMMARY OF THE INVENTION

In accordance with the invention a two-wheel tractor is provided with an improved type of steerable two-wheel trailer having numerous advantages over the conventional types of sulkies noted above. The trailer has a steering mechanism which enables an operator of the tractor seated in the trailer to bring about turning movement of the tractor-trailer assembly in a natural and efficient manner by applying a lateral steering force to the handlebars of the tractor. Thus, this arrangement eliminates the need for a separate steering wheel as provided in the aforementioned type of steerable sulky and enables the operator to steer the tractor in a natural manner by moving the handlebars laterally as though he were walking behind the tractor.

Steering is accomplished with considerably less force than required with the aforementioned type of non-steerable sulky. Additionally, the steering mechanism of this invention minimizes lateral movement of the handlebars relative to the operator when executing a turn. Thus, the tractor controls stay well within the reach of the operator at all times.

Additionally, the tractor and trailer assembly in accordance with this invention has enhanced lateral stability for safer operation on hills and uneven terrain. The enhanced stability permits a much shorter turning radius than the aforementioned earlier types of sulkies for use with the two-wheel tractors.

The steerable two-wheel trailer of this invention comprises a frame having a forwardly extending tongue connected to the tractor, a pair of wheels, and a steering mechanism carried by the frame and connected to the wheels and operable for effecting unison pivotal movement of the wheels upon the application of a lateral steering force to the handlebars of the tractor so as to thereby steer the tractor and trailer assembly in the desired direction.

The steering mechanism, more particularly, includes a pair of wheel mounts pivotally carried by the frame, crank means pivotally connected to the frame, tie rod means connecting the pivotally mounted crank means with the wheel mounts for effecting pivotal movement of the wheel mounts in response to pivotal movement of the crank means, and an elongate arm pivotally connected to the crank means and extending forwardly therefrom to the tractor and being pivotally connected to the tractor adjacent to the connection of the tongue to the tractor. The arm is operable for effecting pivotal movement of the crank upon articulative movement between the tractor and trailer so that upon application of a lateral steering force to the handlebars of the tractor, the trailer wheels are pivotally moved to thereby steer the tractor and trailer assembly in the desired direction.

In driving the tractor-trailer assembly of this invention, the operator, who is seated in the trailer within reach of the tractor handlebars, initiates a turn by applying a lateral steering force to the handlebars in a direction opposite to the desired direction of turn. This is a natural action on the part of the operator which is similar to the action required if the operator were walking behind the tractor. The application of the lateral steering force to the handlebars during movement of the tractor causes the tractor to begin to articulate or turn relative to the trailer. This articulative movement, in turn, causes the trailer wheels to be pivoted in the same direction as the force applied to the handlebars, thus steering the trailer laterally relative to the tractor so the tractor and trailer assembly turns as a unit in the desired direction. The turn is completed by applying a steering force to the handlebars in the opposite direction.

The pivotal movement of the wheels relative to the frame enables the tractor-trailer assembly to execute turns of relatively small radius, and this is accomplished with only a limited amount of articulative movement between the tractor and trailer. This provides greatly enhanced lateral stability to the tractor and trailer assembly for enhanced safety on hills and uneven terrain, and while minimizing the lateral movement of the handlebars so that the tractor controls remain within the reach of the operator at all times.

Several prior patents have shown trailers which are provided with a steering mechanism for turning the trailer wheels. Note for example Mahaffey U.S. Pat. No. 2,100,447; Wilson U.S. Pat. No. 2,450,215; Barrington U.S. Pat. No. 2,470,842; and Folkert U.S. Pat. No. 3,753,580. However, the steerable trailers of the aforementioned patents are used only in association with four-wheel towing vehicles, and for the purpose of causing the wheels of the trailer to track in the same path as the wheels of the towing vehicle. When so used, the steerable trailer has no significant effect on the steering of the towing vehicle and trailer assembly, since the steering is controlled by the four-wheel towing vehicle.

Pursuant to the present invention, where a towing vehicle in the form of a two-wheel tractor is used in combination with a steerable trailer, the resulting vehicle assembly functions in a completely new and advantageous manner. The tractor and trailer assembly possesses steering characteristics and enhanced stability not previously obtainable in a two-wheel tractor and trailer assembly.

BRIEF DESCRIPTION OF THE DRAWINGS

Some of the features and advantages of the invention having been stated, others will become apparent when taken in connection with the accompanying drawings, in which.

DETAILED DESCRIPTION OF ILLUSTRATIVE EMBODIMENT

Figure 1:
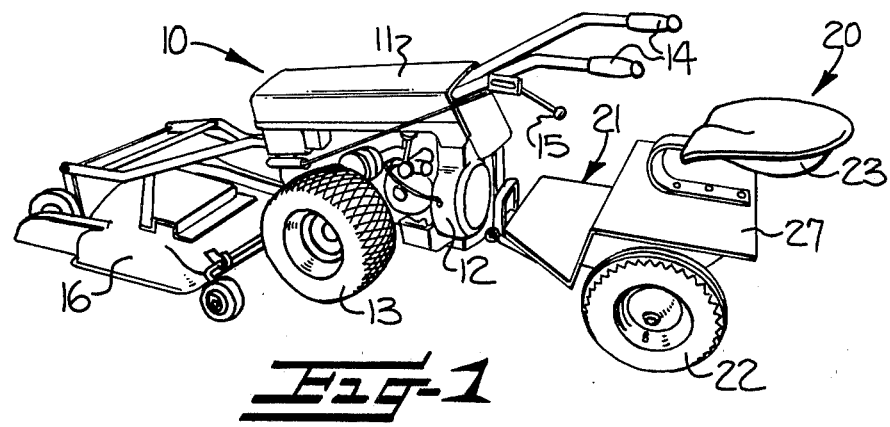
FIG. 1 is a perspective view showing a two-wheel tractor provided with a steerable sulky in accordance with this invention.

Referring now more particularly to the drawings, and initially to FIG. 1 thereof, reference character 10 generally indicates a conventional type of two-wheel garden tractor which includes a housing 11 containing a motor and transmission assembly 12 and a pair of wheels 13 drivingly connected to the motor and transmission assembly 12. For enhanced traction, two-wheel tractors are sometimes provided with a pair of dual wheels instead of the pair of single wheels as illustrated, but the term "two-wheel" tractor is generally understood as being applicable to both of these wheel arrangements. Handlebars 14 extend rearwardly from the tractor for guiding the tractor, with suitable controls 15 being mounted at an accessible location on the handlebars for controlling the motor and/or transmission. As illustrated, a rotary mower attachment 16 is mounted at the front of the tractor.

A two-wheel trailer in the form of a sulky, generally indicated by the reference character 20, is detachably connected to the rear of the tractor 10 to permit the tractor to be operated as a riding mower. The sulky 20 includes a frame 21 supported by a pair of wheels 22 with a seat 23 being mounted on the frame and located so as to enable an operator to be seated in the sulky in position for grasping the handlebars 14 of the tractor.

Figure 2:
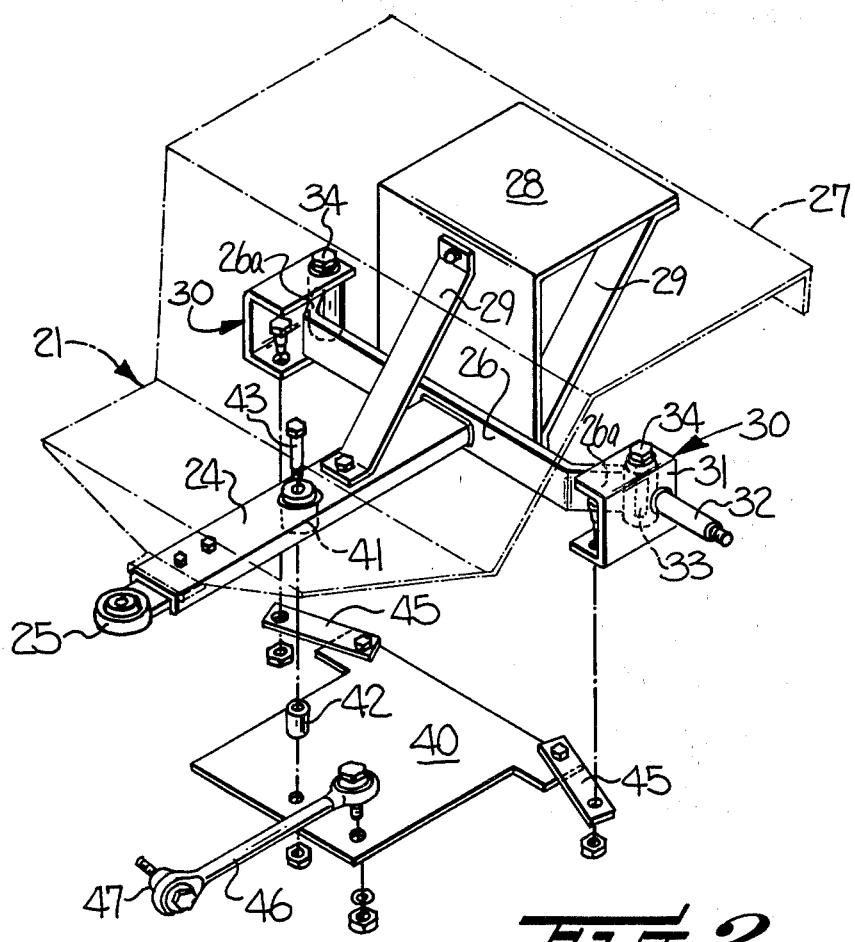
FIG. 2 is an exploded perspective view showing the steering mechanism of the steerable sulky.

Referring now to FIG. 2, the frame 21 of the sulky is of generally T-shaped configuration and includes an elongate forwardly extending tongue 24 having a hitch 25 provided at the forwardmost end thereof to permit detachably connecting the sulky to the tractor 10. A transversely extending axle 26 is welded on otherwise suitably secured to the tongue 24 adjacent the rearmost end of the tongue. A deck 27, shown in broken lines in FIG. 2, is carried by the tongue 24 and by a deck support 28 connected to and extending upwardly from axle 26. Braces 29 are provided for reinforcing the deck support to provide enhanced structural strength to the deck.

A wheel mount 30 is pivotally connected to the axle 26 adjacent each end thereof. As illustrated, the wheel mount 30 includes an elongate U-shaped cross section channel member 31, with a wheel spindle 32 secured to and extending laterally from the medial portion of the channel member 31 adjacent one end of the channel member. The wheel spindle 32 is oriented generally in alignment with the transversely extending axle 26. As illustrated, a vertically extending bore 33 is formed in the endmost portions of axle 26, and a kingpin 34 extends through the opposing legs of U-shaped channel member 31 and through the bore 33 for pivotally securing the wheel mount 30 to the axle 26. The end portion of the elongate channel member 31 opposite the pivotal connection to the axle serves as a steering arm for effecting pivotal movement of the wheel mount.

A mechanical linkage is carried by the frame and connected to the wheel mounts 31 for effecting unison pivotal movement of the wheel mounts when articulative movement occurs between the tractor 10 and the frame 21 of the sulky. More particularly, the linkage includes a crank 40 in the form of a generally rectangularly shaped plate, the forwardmost portion of which is pivotally connected to the tongue 24. As illustrated, a hub 41 is welded to the underside of the tongue 24, and a small bushing 42 is positioned inside the hub 41 with a bolt 43 extending therethrough and through the crank for pivotally securing the crank 40 to the tongue 24.

Respective tie rods 45 are pivotally connected to the crank 40 adjacent the rearmost corners thereof with the opposite ends of the tie rods 45 being pivotally connected to the channel members 31. By this arrangement, pivotal movement of the crank 40 will cause unison pivotal movement of the respective wheel mounts 30 in a common direction. An elongate actuator arm 46 is pivotally connected to the crank 40 and extends forwardly therefrom to the tractor 10. The forwardmost end of the steering link includes a ball joint 47 which pivotally connects the actuator arm 46 to the tractor alongside the connection of the hitch 25 to the tractor.

Figure 3:
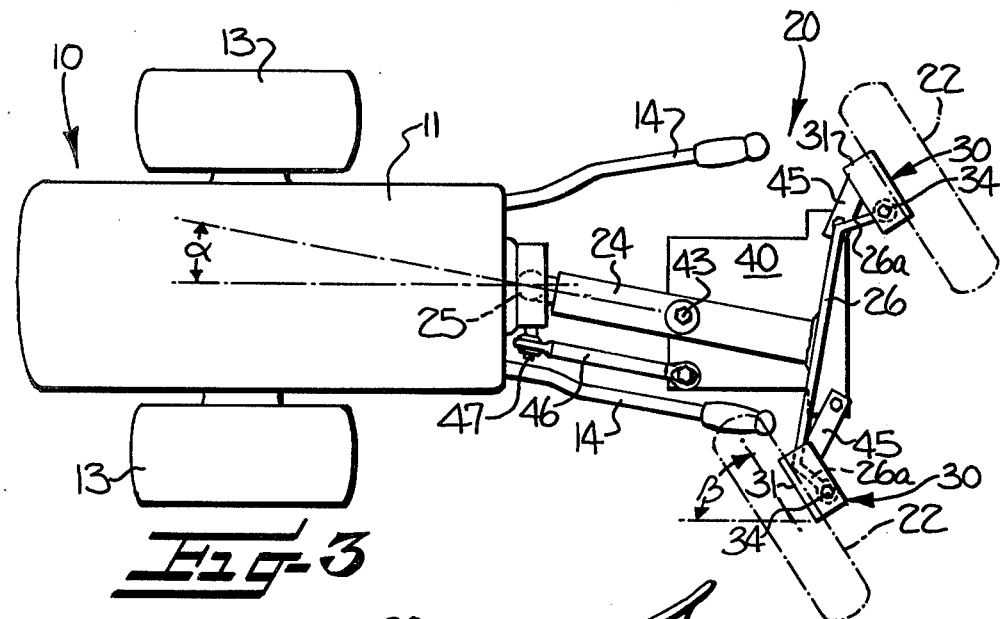
FIG. 3 is a plan view of the tractor and steerable sulky with portions of the sulky removed to reveal the steering mechanism.
Figure 4:
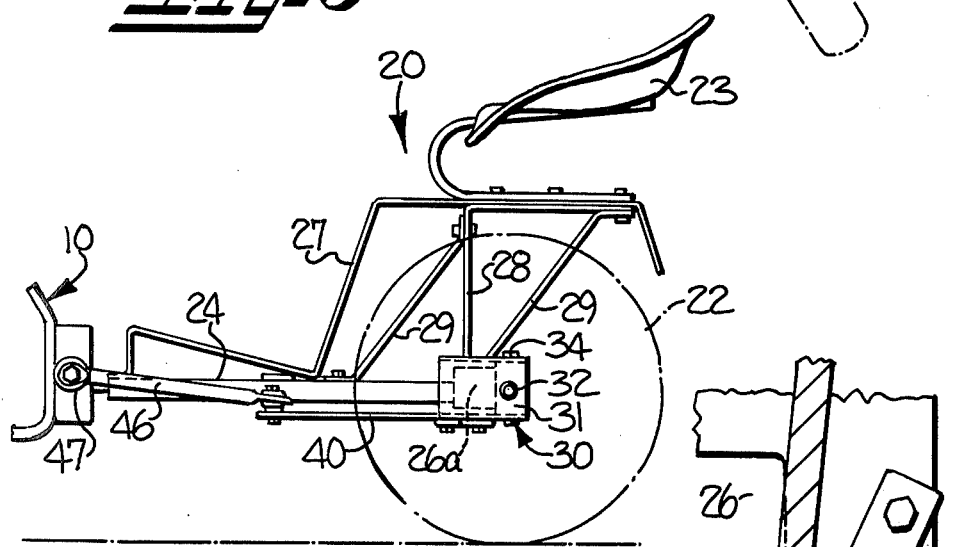
FIG. 4 is a side elevational view of the steerable sulky.
Figure 5:
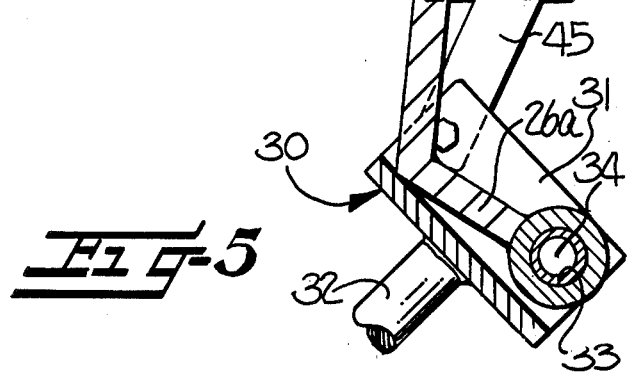
FIG. 5 is a cross sectional detail view of a portion of the steering mechanism.

Referring now to FIG. 3, it will be seen that the tongue 24 and actuator arm 46 define an articulated parallelogram type of linkage between the tractor 10 and the crank 40. When the tractor turns a relatively small amount with respect to the sulky, the actuator arm 46 pivots the crank 40 relative to the frame to cause the wheels of the sulky to be turned, thereby causing the sulky to also turn and to assist in steering the tractor and sulky assembly through the turn.

An operator seated in the sulky will steer the tractor and sulky assembly by grasping the handlebars 14 and applying a lateral steering force thereto. The steering of the handlebars is performed in the same way as if the operator were walking behind the tractor. The application of a lateral steering force to the handlebars during movement of the tractor causes the tractor to begin to turn or articulate a relatively small amount with respect to the sulky. Upon articulative movement of the tractor relative to the sulky, the steering mechanism of the sulky causes the sulky wheels to be turned in the appropriate direction so as to assist in the completion of the turn.

It will be appreciated that this type of steering linkage greatly reduces the amount of steering force required to execute a turn as compared to the previously known type of non-steerable sulky since the operator needs only to apply enough force to the handlebars to bring about a relatively small articulative movement between the tractor and the trailer. As soon as this relatively small articulative movement occurs, the steering mechanism causes the sulky wheels to turn, thus steering the sulky relative to the tractor and causing futher articulative movement therebetween.

Because of the steering assist provided by the pivotal turning of the wheels, the amount of articulative movement between the tractor and sulky is minimized, thus greatly enhancing the lateral stability of the tractor and sulky assembly, reducing the likelihood of jackknifing or accidental overturning on rough or uneven terrain and enabling the tractor and sulky assembly to safely execute turns of greatly reduced radius, thus providing greater maneuverability than heretofore possible. The reduced amount of articulative movement between the tractor and sulky also reduces the amount of handlebar displacement relative to the sulky, thus insuring that the handlebars and the tractor controls remain within the reach of the operator at all times. As seen in FIG. 3, a relatively small angle of articulative movement $\alpha$ between the axis of the tractor and the axis of the sulky bring about a relatively large angle of turn $\beta$ between the plane of the sulky wheels and the axis of the tractor.

For purposes of safety and to prevent accidental overturning of the tractor and trailer assembly as a result of turning too sharply, means are preferably included for limiting the amount of pivotal movement of the wheels relative to the frame. As illustrated, the axle 26 has a rearward bend adjacent each end thereof so as to position the end portions 26a of the axle in rearwardly extending angular relation relative to the remainder of the axle. The angularly extending endmost portion 26a of the axle serves to form an abutment stop for engaging the U-shaped channel member 31 when the wheel mount 30 is pivotally moved a predetermined amount so as to thereby limit the amount of pivotal movement of the wheels.

In the drawings and specification, there has been set forth a preferred embodiment of the invention, and although specific terms are employed, they are used in a generic and descriptive sense only and not for purposes of limitation.

That which is claimed is:

1. In combination, a two-wheel tractor having rearwardly extending handlebar means adapted for guiding the tractor, and a steerable two-wheel trailer articulately connected to said tractor and positioned rearwardly thereof and including means for receiving an operator of the tractor on the trailer in position for grasping said handlebar means and applying a lateral steering force thereto, and said trailer comprising a frame having a forwardly extending tongue pivotally connected to said tractor, a pair of wheels, a pair of wheel mounts pivotally carried by said frame and mounting said wheels for pivotal movement relative to said frame, and linkage means carried by said frame and connected to said wheel mounts and to said tractor and operable for effecting unison pivotal movement of said wheels upon articulative movement between said tractor and said frame as a result of the application of a lateral steering force to said handlebar means during movement of the tractor so as to thereby steer the tractor and trailer assembly in the desired direction while minimizing the steering force required upon the handlebar means and the amount of lateral movement thereof relative to the trailer and while also providing enhanced lateral stability to the tractor and trailer assembly.

2. In combination, a two-wheel tractor having a motor and transmission assembly, a pair of driven wheels connected to said motor and transmission assembly, and a pair of rearwardly extending handlebars adapted for guiding the tractor, and a steerable two-wheel sulky articulately connected to the rear of said tractor, said sulky comprising a frame having a forwardly extending tongue pivotally connected to said tractor, a seat carried by said frame and positioned rearwardly of said handlebars to permit an operator of the tractor to be seated in the sulky in position for grasping said handlebars and applying a lateral steering force thereto, a pair of wheels, a pair of wheel mounts pivotally carried by said frame and mounting said wheels for pivotal movement relative to said frame, and linkage means carried by said frame and connected to said wheel mounts and to said tractor and operable for effecting unison pivotal movement of said wheels upon articulative movement between said tractor and said frame as a result of the application of a lateral steering force to said handlebars during movement of the tractor so as to thereby steer the tractor and sulky assembly in the desired direction while minimizing the steering force required upon the handlebars and the amount of lateral movement thereof relative to the sulky and while also providing enhanced lateral stability to the tractor and sulky assembly.

3. In combination, a two-wheel tractor having rearwardly extending handlebar means adapted for guiding the tractor, and a two-wheel trailer articulately connected to the rear of said tractor and characterized by having a steering mechanism adapted to permit an operator of the tractor seated in the trailer to steer the tractor and trailer assembly in a natural and efficient manner by applying a lateral steering force to the handlebar means of said tractor, said trailer comprising a frame having a forwardly extending tongue pivotally connected to said tractor, a pair of wheels, respective wheel mounts pivotally carried by said frame and mounting said wheels for pivotal movement relative to the frame, crank means pivotally connected to said frame, tie rod means connecting said pivotally mounted crank means with said wheel mounts for effecting unison pivotal movement of the wheel mounts in response to pivotal movement of said crank means, and an elongate arm pivotally connected to said crank means and extending forwardly therefrom to said tractor and being pivotally connected to the tractor adjacent to the connection of said tongue to the tractor for effecting pivotal movement of said crank means upon articulative movement between said tractor and said frame so as to thereby bring about unison pivotal movement of said wheels upon application of a lateral steering force to said handlebar means during movement of the tractor and thereby steering the tractor and trailer assembly in the desired direction while minimizing the steering force required upon the handlebar meand and the amount of lateral movement thereof relative to the trailer and while also providing enhanced lateral stability to the tractor and trailer assembly.

4. The combination according to claim 3, including means for limiting the amount of pivotal movement of the wheel mounts relative to the frame to prevent accidental overturning of the tractor and trailer assembly as a result of turning too sharply.

5. The combination according to claim 3, wherein said frame is of generally T-shaped configuration and includes an elongate axle connected to and extending transversely of said forwardly extending tongue, and wherein said wheel mounts are pivotally connected to opposite ends of said axle.

6. The combination according to claim 5, wherein said axle has a rearward bend adjacent each end thereof positioning the end portions of the axle in rearwardly extending angular relation relative to the remainder of the axle, and wherein the rearwardly extending end portions of the axle define abutment stops cooperating with said wheel mounts for limiting the amount of pivotal movement thereof relative to the frame to thereby prevent accidental overturning of the tractor and trailer assembly as a result of turning too sharply.

7. The combination according to claim 5, wherein each wheel mount comprises a channel member, a pin extending through one end of said channel member and pivotally connecting the same to the end of said axle, a wheel spindle carried by said channel member and upon which the wheel is mounted, and means pivotally connecting a respective one of said tie rod means to said channel member at a location spaced from said pin.

8. In combination, a two-wheel tractor having a motor and transmission assembly, a pair of driven wheels connected to said motor and transmission assembly, and a pair of rearwardly extending handlebars adapted for guiding the tractor, and a two-wheel sulky articulately connected to the rear of said tractor and characterized by having a steering mechanism adapted to permit an operator of the tractor seated in the sulky to steer the tractor and sulky assembly in a natural and efficient manner by applying a lateral steering force to the handlebars of said tractor, said sulky comprising a frame having a forwardly extending tongue pivotally connected to said tractor and an elongate axle connected to and extending transversely of said forwardly extending tongue, a seat carried by said frame and positioned rearwardly of said handlebars to permit an operator of the tractor to be seated in the sulky in position for grasping said handlebars and applying a lateral steering force thereto, a pair of wheels, respective wheel mounts pivotally connected to opposite ends of said axle and mounting said wheels for pivotal movement relative to the frame, crank means pivotally connected to said frame, tie rod means connecting said pivotally mounted crank means with said wheel mounts for effecting unison pivotal movement of the wheel mount in response to pivotal movement of said crank means, and an elongate arm pivotally connected to said crank means and extending forwardly therefrom to said tractor and being pivotally connected to the tractor for effecting pivotal movement of said crank means upon articulative movement between said tractor and said frame so as to thereby bring about unison pivotal movement of said wheels upon application of a lateral steering force to said handlebars during movement of the tractor and thereby steering the tractor and sulky assembly in the desired direction while minimizing the steering force required upon the handlebars and the amount of lateral movement thereof relative to the sulky and while also providing enhanced lateral stability to the tractor and sulky assembly.

* * * * *

UNITED STATES PATENT OFFICE
CERTIFICATE OF CORRECTION

PATENT NO. : 4,192,525
DATED : March 11, 1980
INVENTOR(S) : John D. Clark

It is certified that error appears in the above-identified patent and that said Letters Patent are hereby corrected as shown below:

Column 7, line 3, "meand" should be --means--.

Signed and Sealed this

Eighth Day of July 1980

[SEAL]

Attest:

Attesting Officer

SIDNEY A. DIAMOND

Commissioner of Patents and Trademarks